June 26, 1962 A. H. ROSS 3,041,469

TRANSLATING CIRCUIT PRODUCING OUTPUT ONLY WHEN INPUT IS BETWEEN PREDETERMINED LEVELS UTILIZING DIFFERENT BREAKDOWN DIODES

Filed March 7, 1960

INVENTOR,
ARTHUR H. ROSS.
BY
Harry M. Saragovitz
ATTORNEY.

United States Patent Office 3,041,469

Patented June 26, 1962

3,041,469

TRANSLATING CIRCUIT PRODUCING OUTPUT ONLY WHEN INPUT IS BETWEEN PREDETERMINED LEVELS UTILIZING DIFFERENT BREAKDOWN DIODES

Arthur H. Ross, Shrewsbury, N.J., assignor to the United States of America as represented by the Secretary of the Army

Filed Mar. 7, 1960, Ser. No. 13,401
7 Claims. (Cl. 307—88.5)
(Granted under Title 35, U.S. Code (1952), sec. 266)

The invention described herein may be manufactured and used by or for the Government for governmental purposes without the payment of any royalty thereon.

This invention relates to a voltage responsive circuit and more particularly to a transistor circuit having one output voltage when the input voltage is between two predetermined values and another output voltage when the input voltage is any other value.

Prior to applicant's invention, circuits providing an output voltage when the input voltage was between two predetermined values necessitated the use of a large number of components, and as a result required a correspondingly large amount of space and power.

Accordingly, it is a primary object of this invention to provide a compact voltage responsive circuit requiring a small number of components.

Another object of this invention is to provide a stable voltage responsive circuit requiring little power.

A further object of the invention is the provision of an improved circuit for analogue to digital conversion of information.

A more specific object of this invention is the provision of a circuit suitable for decoding an amplitude quantized signal.

In a preferred embodiment of the present invention a pair of transistors is utilized. The collector voltage of the first transistor is applied as a bias voltage to the base of the second transistor in such a manner that when the first transistor is conducting, the second transistor is nonconducting. A first zener diode is connected in series with a resistor across the input terminals. The resistor is connected across the emitter and base terminals of the first transistor; so that when the input voltage exceeds the breakdown voltage of the first zener diode, a current will flow in the series circuit of the resistor and zener diode to cause a bias voltage to be applied to the first transistor to allow it to conduct. The second transistor is then cut off and its collector voltage rises. A second series connection of a resistor and a zener diode having a breakdown voltage higher than the first diode is connected between one input terminal and the emitter-collector path of the first transistor and to the base of the second transistor in such a manner that when a further rise in input voltage causes the second diode to break down, the second transistor is rendered conducting and its collector voltage drops to its initial value.

Another embodiment of the invention combines a plurality of the above mentioned circuits in a cascade or ladder arrangement whereby a number of outputs are provided, each representative of a different input voltage level.

Figure 1:
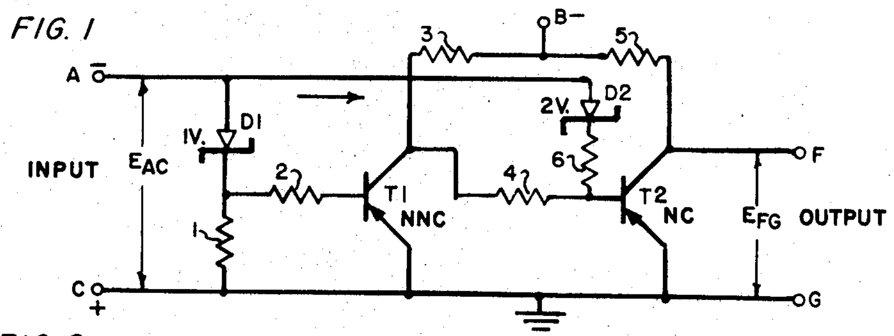
Figure 2:
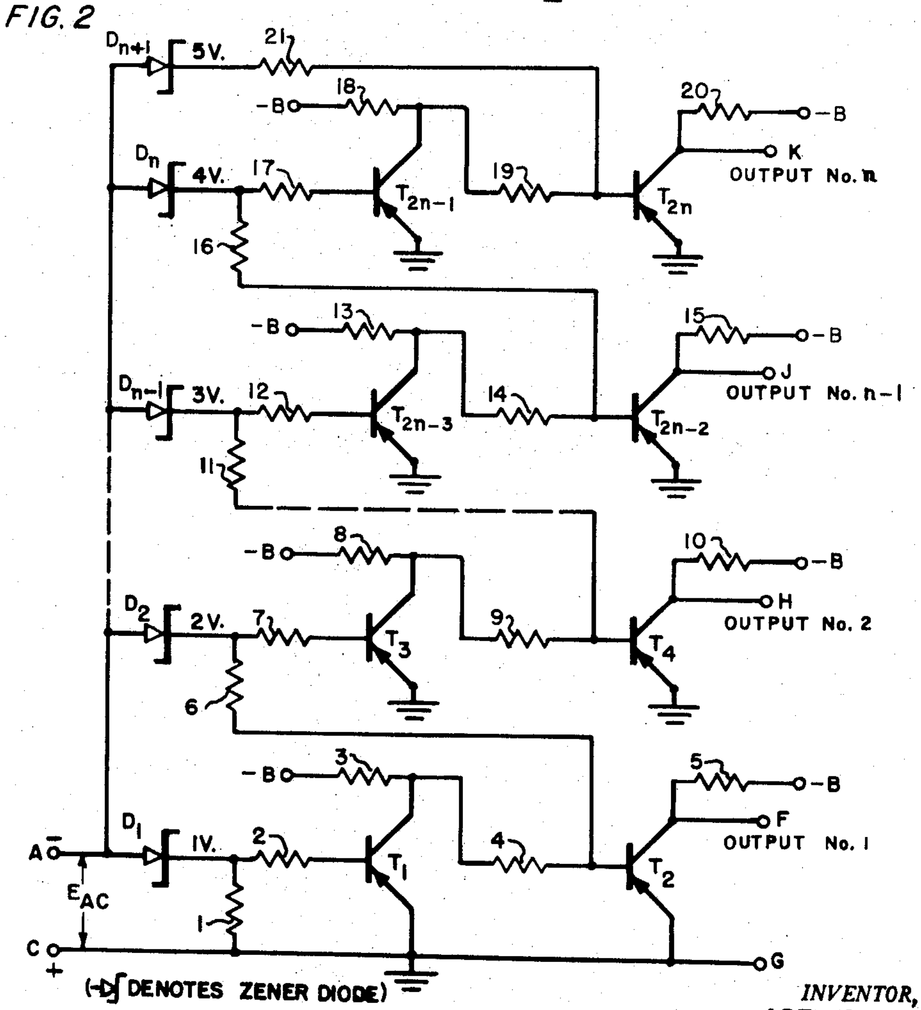

Further objects and features of the invention will become apparent upon consideration of the following detailed description taken in conjunction with the drawings in which:

FIG. 1 is a circuit diagram of a transistor voltage controlled circuit constructed in accordance with one embodiment of the invention; and FIG. 2 is a circuit diagram of a second embodiment of the invention utilizing a plurality of circuits the type shown in FIG. 1.

Referring now to FIG. 1, there is shown a first PNP transistor $T_1$ having its collector connected to a source of B— through a resistor 3 and to the base of a second PNP transistor $T_2$ through a resistor 4. The collector of transistor $T_2$ is connected to B— through resistor 5 and the emitters of transistors $T_1$ and $T_2$ are connected to ground. A positive input voltage is applied to terminal C which is connected to ground and to one end of a resistor 1, the other end of which is connected in series with a resistor 2 to the base of a transistor $T_1$. A zener diode $D_1$ having a predetermined breakdown voltage is connected between negative input terminal A and the junction between resistors 1 and 2. Input voltage across terminals A and C is applied to zener diode $D_1$ in its inverse direction. A second zener diode $D_2$ having higher breakdown voltage than zener diode $D_1$ is connected between negative input terminal A and to the junction between the base of transistor $T_2$ and resistor 4 through resistor 6. Zener diode $D_2$ is also poled to conduct current in its inverse direction with respect to the input at terminals A, C. The output of the system shown in FIG. 1 is applied to output terminals F and G with terminal F being connected to the collector of transistor $T_2$ and terminal G being connected to ground.

In the operation of the circuit of FIG. 1, first consider the condition when the input voltage $E_{AC}$ across terminals A, C is less than the breakdown voltage or zener diode $D_1$. In this event no current will flow in the series path formed by resistor 1 and diode $D_1$ between terminals A, C, and no voltage will be developed across resistor 1. As a result, transistor $T_1$ will not receive a high enough bias voltage at its base to enable it to conduct. This results in a high negative voltage substantially equal to B— in magnitude appearing at its collector which is applied as a bias voltage to the base of transistor $T_2$ which thereby enables transistor $T_2$ to conduct current from ground through resistor 5 to B—. When transistor $T_2$ is conducting, the voltage at its collector, which is connected to output terminal F, is low and thus the output voltage $E_{FG}$ across terminals F, G is low. By proper selection of transistor $T_2$ and resistors 4 and 5, this voltage can be made nearly zero.

When the input voltage $E_{AC}$ is above the breakdown voltage of zener diode $D_1$ but below the breakdown voltage of diode $D_2$, a voltage is developed across resistor 1 by the current which diode $D_1$ conducts from positive terminal C to negative terminal A through resistor 1. This voltage across resistor 1 is applied as a bias voltage to the base of transistor 1 and allows the emitter-collector path of transistor 1 to conduct current from ground to B— through resistor 3. As a result, the voltage at the collector of transistor $T_1$ drops to a low state and causes transistor $T_2$ to be cut off. Thus the voltage at the collector of transistor $T_2$, and therefore the output voltage $E_{FG}$, will be high, substantially equal in magnitude to B—.

Further increasing input voltage $E_{AC}$ will not affect the operation of transistor $T_1$ and its associated circuitry. However, when the input voltage $E_{AC}$ exceeds the breakdown voltage of zener diode $D_2$, the magnitude of the emitter-base voltage of transistor $T_2$ established by the voltage drop across resistor 4 and transistor $T_1$ by current flowing through diode 2 and resistor 4 increases sufficiently to allow transistor $T_2$ to again conduct and thus reduces output voltage $E_{FG}$ to zero.

It can readily be seen that the circuit of FIG. 1 will have an output voltage $E_{FG}$ of zero when the input voltage $E_{AC}$ is above or below the upper and lower limits established by zener diodes $D_2$ and $D_1$ respectively, and will have an output voltage approximately equal in magnitude to B— when the input voltage $E_{AC}$ lies between the limits imposed by zener diodes $D_1$ and $D_2$.

FIG. 2 shows how *n* circuits of the type shown in FIG. 1 may be connected in parallel to provide a plurality of outputs, each indicative of a different range or level of input voltages. The reference numbers of the elements of the first stage in the circuit of FIG. 2 are the same as those used for like elements in FIG. 1 since this portion of the circuit is the same as the circuit of FIG. 1. The second stage comprising PNP transistors $T_3$ and $T_4$ is added to the first stage by connecting the base of transistor $T_3$ to the junction of diode $D_2$ and resistor 6 through a resistor 7. The collector of transistor $T_3$ is connected to the base of transistor $T_4$ through a resistor 9 and to B— through a resistor 8, and the collector of transistor $T_4$ is connected directly to output terminal H and to B— through a resistor 10. The emitters of transistors $T_3$ and $T_4$ are connected to ground. In the circuit shown in FIG. 2, the upper cut-off voltage for the second stage is established by zener diode $D_{n-1}$, the high resistance side of which is connected to the junction between the base of transistor $T_4$ and resistor 9 through resistor 11. Negative terminal A is directly connected to the low resistance side of zener diode $D_{n-1}$.

The $n-1$ stage of the circuit of FIG. 2 comprising PNP transistors $T_{2n-3}$ and $T_{2n-2}$ is added to the preceding stage by connecting the base of transistor $T_{2n-3}$ to the junction of diode $D_{n-1}$ and resistor 11 through a resistor 12. The collector of transistor $T_{2n-3}$ is connected to the base of transistor $T_{2n-2}$ through a resistor 14 and to B— through a resistor 13, and the collector of transistor $T_{2n-2}$ is connected directly to output terminal J and to B— through a resistor 15. The emitters of transistors $T_{2n-3}$ and $T_{2n-2}$ are connected to ground, the high-resistance side of zener diode $D_n$ is connected to the junction between the base of transistor $T_{2n-2}$ and resistor 14 through resistor 16, and negative terminal A is connected directly to the low resistance side of diode $D_n$.

The *n*th stage of the circuit comprises PNP transistors $T_{2n-1}$ and $T_{2n}$ and is added to the $n-1$ stage by connecting the base of transistor $T_{2n-1}$ to the junction of zener diode $D_n$ and resistor 16 through a resistor 17. The collector of transistor $T_{2n-1}$ is connected to the base of transistor $T_{2n}$ through resistor 19 and to B— through resistor 18, and the collector of transistor $T_{2n}$ is connected directly to output terminal K and to B— through resistor 20. The emitters of transistors $T_{2n-1}$ and $T_{2n}$ are connected to ground. The high resistance side of zener diode $D_{n+1}$ is connected to the junction between the base of transistor $T_{2n}$ and resistor 19 through resistor 21, and negative terminal A is connected directly to the low resistance side of diode $D_{n+1}$.

The output voltages of FIG. 2 are each taken between an appropriate output terminal F, H, J, or K and a common terminal, which for purposes of illustration is shown as ground, the circuit being so arranged that appreciable output voltage is obtained between only one output terminal F, H, J, or K, and the common terminal (ground or G) at a time under control of the input voltage. This is done by selecting the zener diodes $D_1$, $D_2$, $D_{n-1}$, $D_n$, and $D_{n+1}$ so that the breakdown voltage of $D_1$ is less than the breakdown voltage of $D_2$, which in turn is less than the breakdown voltage of $D_{n-1}$ and so on, so that $D_{n+1}$ has the highest breakdown voltage of all the zener diodes.

The operation of the first stage of FIG. 2 is exactly the same as discussed in conjunction with FIG. 1 and each of the succeeding stages operate in a similar manner. However, only one zener diode per stage is required instead of two, because each diode except for $D_1$ and $D_{n+1}$ acts to provide the lower or threshold limit for one stage and the upper or cut-off voltage limit for the preceding stage. For example, when the input voltage $E_{AC}$ rises above the breakdown voltage of diode $D_2$, the voltage drop across resistor 4 causes transistor $T_2$ to conduct and the output voltage $E_{FG}$ to drop to zero as discussed in the description of the operation of the circuit of FIG. 1. However, at the same time a voltage drop occurs between ground and the base of transistor $T_3$ due to the current flowing through resistors 4 and 6 which causes previously nonconducting transistor $T_3$ to conduct. Previously conducting transistor $T_4$ is then cut off due to the drop in bias voltage at its base and a high output is developed between terminal H and ground. When the input voltage continues to rise until the breakdown voltage of $D_{n-1}$ is reached, transistor $T_4$ is again rendered conductive by the voltage drop across resistor 9 and output No. 2 drops to zero. At the same time, transistor $T_{2n-3}$ is biased to conduction and its collector voltage drops thereby cutting off transistor $T_{2n-2}$ which results in a high output voltage between terminal J and ground. As the breakdown voltage of each successive diode is surpassed, the output of the previous stage drops to zero and the output for the stage associated with the diode rises to a value which is substantially the magnitude of B—. Diode $D_{n+1}$ is required to eliminate output No. *n* when the input voltage exceeds the value established by diode $D_{n+1}$. If no upper limit were desired, diode $D_{n+1}$ and resistor 21 could be eliminated.

In the case that the first range of input voltage $E_{AC}$ starts at zero volts, diode $D_1$, transistor $T_1$, and resistors 1, 2, and 3 could be eliminated and resistor 4 would then be connected between ground and the base of transistor 2.

The circuit shown in FIG. 2 can be utilized in a variety of applications such as conversion of analogue or amplitude quantized information to digital information.

It will be readily apparent to those skilled in the art that the PNP transistors used in FIGS. 1 and 2 could be replaced by NPN transistors by suitable reversal of the voltage and diode polarities shown. Similarly, with well-known circuit modifications, vacuum tube circuits could be used instead of transistors. Also, suitably biased diodes could be used in place of the zener diodes with some sacrifice in the sharpness of differentiation obtained.

It is to be understood that the above described circuits are merely illustrative of the principles of the invention and that various modifications and changes may be made without departing from the spirit and scope of the invention as set forth in the appended claims.

What is claimed is:

1. In a voltage controlled circuit having an input, first and second electronic switches each having two states, means interconnecting said switches such that said second switch is biased to its first state by said first switch when said first switch is in its second state, first voltage responsive means connected to said first switch to cause said first switch to be driven to its first state and said second switch to be driven to its second state when said input exceeds a first predetermined value, a second voltage responsive means connected to said second switch to cause said second switch to be driven back to said first state when said input exceeds a second predetermined value which is higher than said first predetermined value.

2. A voltage controlled circuit according to claim 1 whereby said first and second voltage responsive means are diodes having a predetermined breakdown voltage.

3. A voltage controlled circuit according to claim 2 where said first state is a conductive state and said second state is a non-conductive state.

4. In a voltage controlled circuit having a pair of input terminals, first and second transistors each having a collector, emitter, and base; first impedance means connecting the collector of said first transistor to the base of said second transistor; a first diode having a first predetermined breakdown voltage connected between one of said input terminals and the base of said first transistor; second impedance means connected between the other input terminal and the base of said first transistor; a second diode having a second predetermined breakdown voltage higher than said first breakdown voltage connected between said one input terminal and the base of said second transistor; a common terminal connected to the emitters of said first and second transistors and said other input terminal; means connected to the collectors of said first and second transistors to provide a suitable operating potential; a first output terminal connected to the collector of said second transistor; and a second output terminal connected to said common terminal.

5. A voltage controlled circuit having a variable input voltage comprising: a plurality of stages each having first and second electronic devices, means interconnecting said first and second devices within each stage such that each of said second devices is biased to a conducting state by said first device of the same stage when said first devices are in a non-conducting state, a voltage responsive means for each stage connected to said first electronic devices to cause said first electronic devices to be driven to a conducting state which in turn cause said second electronic devices to be driven to a non-conducting state when said input exceeds a predetermined value established by said voltage responsive means, the voltage responsive means of each successive stage being responsive to a higher voltage than the voltage responsive means of the preceding stage, means also connecting each of said voltage responsive means except the first to the second electronic device of the preceding stage to thereby cause each of said second electronic devices to be driven back to a conducting state when said input voltage exceeds the predetermined value established by the corresponding voltage responsive means connected thereto.

6. A voltage controlled circuit according to claim 5 having output terminals connected to each of said second electronic devices.

7. A voltage controlled system having a variable input voltage comprising: a pair of input terminals, a plurality of voltage controlled circuits connected in cascade across said input terminals, each of said voltage controlled circuits having first and second transistors each having a collector, emitter, and base; a first impedance connecting the collector of said first transistor in each of said circuits to the base of said second transistor; a plurality of diodes each having a different predetermined breakdown voltage; one of said diodes being connected between one of said input terminals and the base of said first transistor in each of said circuits; a second impedance also connecting the base of said first transistor of the first voltage controlled circuit to the other input terminal; the emitters of all of said transistors in said plurality of circuits being connected to a common terminal, said common terminal also being connected to said other input terminal; means connected to the collectors of all of said transistors in said plurality of circuits for providing a suitable operating potential; means connecting the diode in each of said circuits except the first to the base of the second transistor of the preceding circuit; a first output terminal in each of said circuits connected to the collector of said second transistor; and a second output terminal for said plurality of circuits connected to said common terminal.

References Cited in the file of this patent

UNITED STATES PATENTS

| | | |
|---|---|---|
| 2,840,728 | Haugk et al. | June 24, 1958 |
| 2,879,412 | Hoge et al. | Mar. 24, 1959 |
| 2,913,599 | Benton | Nov. 17, 1959 |